United States Patent
Schwenter et al.

(10) Patent No.: US 12,480,795 B2
(45) Date of Patent: Nov. 25, 2025

(54) CORIOLIS FLOW METER

(71) Applicant: Endress+Hauser Flowtec AG, Reinach (CH)

(72) Inventors: Benjamin Schwenter, Ettingen (CH); Ennio Bitto, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 365 days.

(21) Appl. No.: 18/254,779

(22) PCT Filed: Oct. 28, 2021

(86) PCT No.: PCT/EP2021/080028
§ 371 (c)(1),
(2) Date: May 26, 2023

(87) PCT Pub. No.: WO2022/111943
PCT Pub. Date: Jun. 2, 2022

(65) Prior Publication Data
US 2023/0408315 A1    Dec. 21, 2023

(30) Foreign Application Priority Data
Nov. 27, 2020    (DE) ...................... 10 2020 131 452.3

(51) Int. Cl.
*G01F 1/84*    (2006.01)
(52) U.S. Cl.
CPC .......... *G01F 1/8422* (2013.01); *G01F 1/8427* (2013.01)
(58) Field of Classification Search
CPC .............................. G01F 1/8422; G01F 1/8427

USPC ...................................................... 73/861.355
See application file for complete search history.

(56) References Cited

U.S. PATENT DOCUMENTS

| | | | |
|---|---|---|---|
| 10,209,113 B2 | 2/2019 | Young et al. | |
| 2005/0166661 A1 | 8/2005 | Schlosser | |
| 2010/0005906 A1* | 1/2010 | Shimizu | G01F 1/8481 73/861.357 |
| 2019/0170553 A1 | 6/2019 | Lang et al. | |

(Continued)

FOREIGN PATENT DOCUMENTS

| | | |
|---|---|---|
| CN | 105318923 A | 2/2016 |
| CN | 111670343 A | 9/2020 |

(Continued)

*Primary Examiner* — Peter J Macchiarolo
*Assistant Examiner* — Rodney T Frank
(74) *Attorney, Agent, or Firm* — Christopher R. Powers; Endress+Hauser (USA) Holding, Inc.

(57) ABSTRACT

A Coriolis flow meter, includes: a measuring tube arrangement with at least one measuring tube and a fixing body arrangement; at least one oscillation exciter and at least one oscillation sensor; a support apparatus with seat and fixing apparatus, wherein the fixing apparatus has at least one swingable fixing element, wherein the fixing apparatus is adapted to connect the measuring tube arrangement, for example, the at least one measuring tube, via the fixing body arrangement mechanically releasably with the support apparatus body, wherein the at least one fixing element is adapted in the case of connecting the measuring tube arrangement with the support apparatus body to exert a bending force on the fixing body arrangement for elastically bending the fixing body arrangement.

13 Claims, 4 Drawing Sheets

(56) References Cited

U.S. PATENT DOCUMENTS

| | | | |
|---|---|---|---|
| 2020/0088556 A1* | 3/2020 | Voigt | G01F 15/14 |
| 2020/0116612 A1 | 4/2020 | Ruetten et al. | |
| 2020/0200582 A1* | 6/2020 | Skinkle | G01F 1/8468 |
| 2020/0319006 A1* | 10/2020 | Malani | G01D 11/30 |

FOREIGN PATENT DOCUMENTS

| | | |
|---|---|---|
| DE | 102018119887 A1 | 2/2020 |
| EP | 1807681 A2 | 7/2007 |
| WO | 2006056518 A2 | 6/2006 |
| WO | 2011099989 A1 | 8/2011 |
| WO | 2020206030 A1 | 10/2020 |

\* cited by examiner

CORIOLIS FLOW METER

CROSS-REFERENCE TO RELATED APPLICATIONS

The present application is related to and claims the priority benefit of German Patent Application No. 10 2020 131 452.3, filed on Nov. 27, 2020, and International Patent Application No. PCT/EP2021/080028, filed Oct. 28, 2021, the entire contents of which are incorporated herein by reference.

TECHNICAL FIELD

The invention relates to a Coriolis flow meter, preferably for pharmaceutical bioprocess applications.

BACKGROUND

A Coriolis flow meter is a measuring device for registering, for a flowable medium, mass flow, viscosity, density and/or a variable derived therefrom. Field devices of process measurements technology having a measuring transducer of vibration-type and, especially, Coriolis flow meters, have been known for many years. The basic construction of such a measuring device, is described, for example, in EP 1 807 681 A1, wherein, for construction of a field device of the field of the invention in the context of the present invention, comprehensive reference is taken to this publication.

Typically, Coriolis flow meters have one or more oscillatable measuring tubes, which can be made to oscillate by means of an oscillation exciter. These oscillations involve the tube length and are varied by the type of flowable medium located in the measuring tube and its flow velocity. An oscillation sensor, or especially two, mutually spaced oscillation sensors, at another position of the measuring tube can register the varied oscillations in the form of a measurement signal or a plurality of measurement signals. An evaluation unit then ascertains mass flow, viscosity and/or density of the medium from the one or more measurement signals.

Coriolis flow meters with replaceable, single-use, measuring tube arrangements are known. Thus, for example, in WO 2011/099989 A1, a method for producing a monolithically formed measuring tube arrangement of a Coriolis flow measuring device with bent measuring tubes is taught, wherein the measuring tube bodies of the measuring tubes are first solidly formed of a polymer and the passageway to lead the flowable medium is then machined in with a cutting tool. WO 2011/099989 A1 teaches—identically to U.S. Pat. No. 10,209,113 B2—a connecting body, which is adapted to receive and to support a replaceable measuring tube arrangement comprising thin-walled plastic tubes. The securement of the measuring tube arrangement in a support apparatus equipped with the needed exciters and sensors occurs via the connecting body.

The mechanical properties of the measuring tube arrangements suitable for Coriolis flow meters can vary greatly, such that, consequently, specific, characteristic variables such as calibration factor and zero point must be ascertained before use in a Coriolis flow meter. It has been found that the zero point determined in the fine-tuning method differs, as a rule, from the actual zero point of the replaceable measuring tube arrangement in use. Such a deviation can only be corrected with difficulty. A reason is that the deviation depends on the degree of securement of the measuring tube arrangement in the support apparatus, this in turn only being difficultly reproducible by different operators. Another influence is microfriction between the measuring tube arrangement and the body of the support apparatus.

SUMMARY

An object of the invention is to provide a Coriolis flow meter, which is suitable for single-use applications and which is insensitive to mechanical disturbing influences.

The object is achieved by the Coriolis flow meter according to the present disclosure.

The Coriolis flow meter of the invention, which is especially suitable preferably for pharmaceutical bioprocess applications, comprises:
a measuring tube arrangement,
    wherein the measuring tube arrangement includes at least one measuring tube, which can be flowed through by a medium,
    wherein the measuring tube arrangement has a fixing body arrangement arranged on the at least one measuring tube;
at least one oscillation exciter, which is adapted to excite the at least one measuring tube to execute oscillations,
    wherein the at least one oscillation exciter has at least two oscillation exciter components,
    wherein the at least two oscillation exciter components comprise at least one exciter magnet and/or exciter coil;
    wherein at least one oscillation exciter component, especially the exciter magnet, is arranged on the measuring tube arrangement;
at least one oscillation sensor, which is adapted to register oscillations of the at least one measuring tube,
    wherein the at least one oscillation sensor has at least two oscillation sensor components,
    wherein the at least two oscillation sensor components comprise at least one sensor magnet and/or sensor coil,
    wherein at least one oscillation sensor component, especially the sensor magnet, is arranged on the measuring tube arrangement;
a support apparatus comprising a support apparatus body, a seat and, especially, the sensor coil and the exciter coil,
    wherein the measuring tube arrangement is arrangeable in the seat and connectable mechanically releasably with the support apparatus body,
    wherein the support apparatus includes a fixing apparatus, which is adapted to secure the measuring tube arrangement in the seat,
    wherein the fixing apparatus has at least one, especially swingable or rotatable, fixing element,
    wherein the fixing apparatus is adapted to connect the measuring tube arrangement, especially the at least one measuring tube, via the fixing body arrangement mechanically releasably with the support apparatus body,
    wherein the at least one fixing element is adapted in the case of connecting the measuring tube arrangement with the support apparatus body to exert a bending force on the fixing body arrangement for elastically bending the fixing body arrangement.

The measuring tube arrangement serves as a single-use part, which can be replaced to prepare for a next use. The support apparatus is adapted to receive the measuring tube arrangement and ideally so to secure it that external mechanical influences as much as possible do not influence the measuring result.

The mechanical coupling between the measuring tube arrangement and the support apparatus occurs via the fixing body arrangement. An elastic bending of the fixing body arrangement by means of the at least one fixing element leads to a mechanical clamping of the fixing body arrangement and a force-interlocked connection. In contrast with the case of a shape-interlocking connection, thus, microfrictions between the at least one fixing element and the fixing body arrangement can be reduced and the zero point of the mass flow more exactly reproduced.

Advantageous embodiments of the invention are set into the dependent claims.

An embodiment provides that in a secured state the bending force has at least one force component pointing in the longitudinal direction of the seat.

For such purpose, the measuring tube arrangement lies with a front face of the fixing body arrangement facing the seat in the secured state, especially parts of an edge region, on a subsection of the support apparatus body. Furthermore, the at least one fixing element is embodied and arranged on the support apparatus body in such a manner that, in the case of the securement of the measuring tube arrangement, a bending force is produced pointing in the longitudinal direction of the seat. Such is preferably maximum in an areal center of gravity of the fixing body arrangement.

An embodiment provides that the support apparatus body has in the seat a bearing area for the fixing body arrangement,
wherein the fixing body arrangement has a first face,
wherein the first face faces the at least one oscillation exciter component,
wherein in a secured state the fixing body arrangement lies with the first face on the bearing area.

The measuring tube arrangement contacts the support apparatus body exclusively via the fixing body arrangement. Such is preferably plate-shaped and lies on the bearing area of the fixing body arrangement. The bearing area can, at least partially, surround the seat of the support apparatus body in a cross section. In that case, a surrounding edge area of the fixing body arrangement lies on the bearing area and is in places free standing, especially there where the at least one fixing element clamps the fixing body arrangement. Alternatively, the bearing area comprises two separated surfaces, which are located on opposing sides of the seat, and the fixing body arrangement is seated on two sides.

An embodiment provides that a clamped area of the fixing body arrangement is offset in the longitudinal direction of the seat, especially in the installation direction of the measuring tube arrangement, by an offset x relative to the bearing area,
wherein $0.05 < x \leq 1$ millimeter, especially $0.1 < x \leq 0.5$ millimeter and preferably $0.15 < x \leq 0.25$ millimeter.

An embodiment provides that the seat is bounded transversely to the longitudinal direction by a support apparatus wall,
wherein at least one step is formed in the support apparatus wall,
wherein the step comprises the bearing area.

An embodiment provides that an offset body is arranged between the step and the fixing body arrangement.

An embodiment provides that the fixing body arrangement has on a first face at least a first area and a second area,
wherein the second area lies in a plane,
wherein the first face faces the at least one oscillation exciter component,
wherein the first area and the second area are arranged offset from one another in the longitudinal direction of the measuring tube arrangement,
wherein the support apparatus body has in the seat one, especially exactly one, essentially planar bearing area for the fixing body arrangement,
wherein in a secured state the first area lies on the bearing area and the fixing body arrangement is bent in such a manner by means of the at least one fixing element that the second area is shifted in the longitudinal direction of the measuring tube arrangement offset from the plane.

An embodiment provides that the first area is arranged in the longitudinal direction of the seat, especially in the installation direction of the measuring tube arrangement, by an offset y relative to the second area,
wherein $0.05 < y \leq 1$ millimeter, especially $0.1 < y \leq 0.5$ millimeter and preferably $0.15 < y \leq 0.25$ millimeter.

An embodiment provides that between the first area and the second area a second step is arranged, which forms the offset y.

An embodiment provides that the at least one fixing element is embodied lever-shaped and swingable about at least one axis.

An embodiment provides that the at least one fixing element has a fixing surface,
wherein in a secured state the fixing surface of the at least one fixing element contacts the fixing body arrangement, especially on the second face.

An embodiment provides that the fixing apparatus includes two, especially diametrally arranged, fixing elements,
wherein the fixing elements have, in each case, a fixing surface,
wherein in a secured state the fixing surfaces of the fixing elements contact the fixing body arrangement, especially on the second face.

An embodiment provides that the measuring tube arrangement comprises two bent measuring tubes,
wherein the measuring tubes have, in each case, an inlet section and an outlet section,
wherein the fixing body arrangement connects the inlet sections and the outlet sections of the measuring tubes with one another.

An embodiment provides that the measuring tubes have, in each case, in the inlet section an inlet longitudinal axis and in the outlet section an outlet longitudinal axis,
wherein a first longitudinal plane extends through the inlet longitudinal axes of the measuring tubes,
wherein a second longitudinal plane extends through the outlet longitudinal axes of the measuring tubes,
wherein the fixing body arrangement has a second face, which is oriented oppositely to the first face,
wherein the first longitudinal plane and the second longitudinal plane bound a first area on the second face of the fixing body arrangement,
wherein in the secured state the fixing surfaces of the fixing elements lie, especially exclusively, on the first area.

An embodiment provides that the measuring tube arrangement includes a first measuring tube and a second measuring tube,
wherein the inlet longitudinal axis and the outlet longitudinal axis of the first measuring tube extend in a third longitudinal plane, wherein the inlet longitudinal axis and the outlet longitudinal axis of the second measuring tube extend in a fourth longitudinal plane, wherein the third longitudinal plane and the fourth longitudinal plane bound a second area on the second face, wherein in the secured state the fixing surface of the fixing elements contacts the fixing body arrangement outside of the second area.

An embodiment provides that the measuring tube arrangement includes a first measuring tube and a second measuring tube, wherein the inlet longitudinal axis and the outlet longitudinal axis of the first measuring tube extend in a third longitudinal plane, wherein the inlet longitudinal axis and the outlet longitudinal axis of the second measuring tube extend in a fourth longitudinal plane, wherein the third longitudinal plane and the fourth longitudinal plane bound a second area on the second face, wherein in the secured state the fixing surface of the at least one fixing element contacts the fixing body arrangement within the second area.

BRIEF DESCRIPTION OF THE DRAWINGS

The invention will now be explained in greater detail based on the appended drawing, the figures of which show as follows.

DETAILED DESCRIPTION

Figure 1:
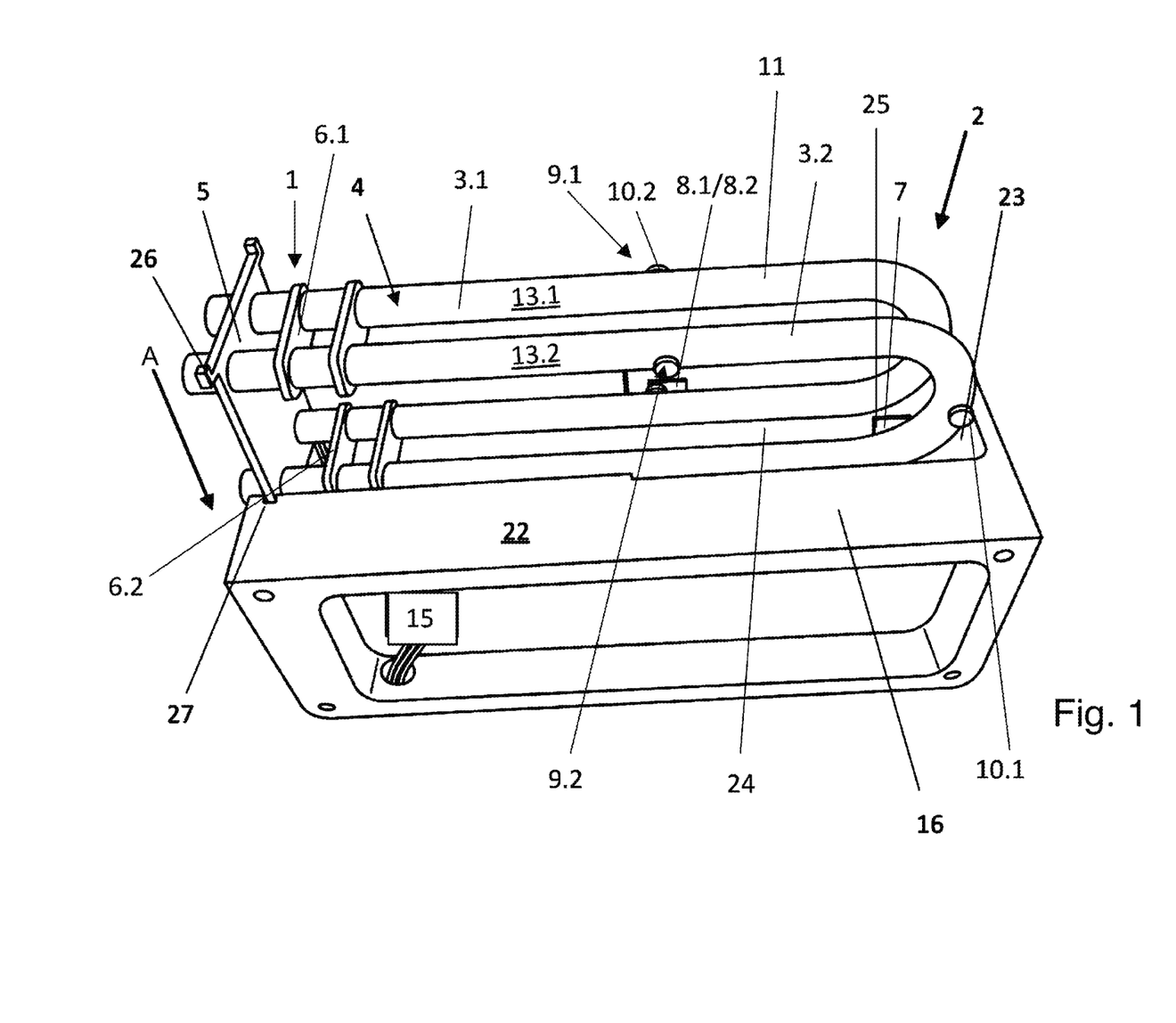
FIG. 1 shows a perspective view of a Coriolis flow meter for pharmaceutical bioprocess applications.

FIG. 1 shows a perspective view of a measuring device 2 in the form of a Coriolis flow meter for pharmaceutical bioprocess applications. A Coriolis flow meter is a measuring device for registering, for a flowable medium, mass flow, viscosity, density and/or a variable derived therefrom. The measuring tube arrangement 4 is suited for insertion replaceably, i.e., mechanically releasably, into a support apparatus 16. For such purpose, only individual components of the oscillation exciter and the oscillation sensors, in particular the magnet arrangements 9.1, 9.2, are placed on the measuring tube arrangement 4. The other components are arranged in the support apparatus 16, especially in the seat 29, which is suited and embodied for receiving the measuring tube arrangement 4. The measuring tube arrangement 4 comprises two bent measuring tubes 3.1, 3.2 extending in parallel relative to one another. The measuring tubes 3.1, 3.2 are connected via a coupler arrangement 1 composed of four coupling elements 6, and via a connecting body 5. Two coupling elements 6.1 in an inlet and two coupling elements 6.2 in the outlet are mounted on the measuring tubes 3.1, 3.2 by material bonding. The measuring tubes 3.1, 3.2 are so formed that the flow direction, shown by two arrows, is oriented in an inlet oppositely to the flow direction in an outlet. In the inlet and in the outlet, in each case, a flow divider can be arranged with a process connection for connecting with a hose- and/or plastic tube system. In an embodiment, exactly one flow divider body can be provided instead of two separate flow dividers. The one flow divider body is plugged in at the inlet and the outlet and contributes to decoupling the measuring tube arrangement 4 from the environment after installation in the support apparatus. The individual coupling elements 6 are plate-shaped and are of one- or two-part construction. The coupling elements can, in each case, completely or only partially grip around the measuring tubes. The measuring tubes 3.1, 3.2 are embodied U-shaped, i.e. such have, in each case, two legs 11 essentially extending in parallel relative to one another and connected together via a bent subsection. Arranged on each of the measuring tubes 3.1, 3.2 is a magnet arrangement 9.1, 9.2. Arranged in the bent subsection is a magnet 10.1 of the magnet arrangement 9.1 for forming a component of the oscillation exciter. Placed on the legs 11 are, in each case, a magnet 10.2, which forms a part of the oscillation exciter. The magnets 10 are placed on mounting areas 14. The mounting areas in the embodiment are located on the measuring tubes 3.1, 3.2.

The measuring tube arrangement 4 is introduced partially into a seat 29 of a support apparatus 16. An arrow, labeled 'A' in FIG. 1, indicates the introduction direction. This extends in the embodiment perpendicularly to a longitudinal direction of the seat 29. The seat can also be embodied in such a manner that the measuring tube arrangement 4 is introduced in the longitudinal direction of the seat (not shown). The support apparatus 16 includes a measuring- and/or operating circuit 15, which is connected with the oscillation exciters and oscillation sensors, especially with their coil systems and which is adapted to produce and/or to register a time alternating, magnetic field. Support apparatus 16 includes a support apparatus body 22, in which the seat 29 is located. The connecting body 5 of the measuring tube arrangement 4 includes assembly surfaces 26, which serve for positioning the measuring tube arrangement 4 in a predetermined position in the support apparatus 16. In the illustrated embodiment, the assembly surfaces 26 extend perpendicularly to the longitudinal direction of the measuring tube arrangement 4. In an additional advantageous embodiment, the assembly surfaces 26 extend in the direction of the longitudinal direction of the measuring tube arrangement 4. The area of the support apparatus body 22 in contact with the assembly surfaces 26 of the connecting body 5 are the bearing surfaces 27.

Support apparatus 16 includes, oriented in parallel with one another, two lateral surfaces, which bound the seat 29 transversely to the longitudinal direction of the seat. Arranged in the lateral surfaces are the coil devices 25 of the oscillation sensors 8.1, 8.2 and the coil device 25 of the oscillation exciter 7. The coil devices 25 of the oscillation sensors 8.1, 8.2 are arranged in the longitudinal direction of the seat relative to the coil device 25 of the oscillation exciter 7. All three coil devices 25 are located in a coil plane. Furthermore, the three coil devices 25 are embodied as flat coils and sunken into the lateral surfaces. In the lateral surfaces, three coil devices 25 are arranged essentially opposite from the three coil devices 25. In the two lateral surfaces, in each case, a guide is machined in, which extends perpendicularly to the longitudinal direction of the seat 29 and in parallel with the coil plane. In the illustrated embodiment, the seat extends over two end faces of the seat 29. This enables an introduction of the measuring tube arrangement 4 perpendicularly to the longitudinal direction of the measuring tube arrangement 4. In an additional embodiment, the seat extends exclusively over one end face. In this case, the measuring tube arrangement 4 is introduced in the longitudinal direction of the measuring tube arrangement 4—and the support apparatus 16—into the support apparatus 16.

Figure 2A:
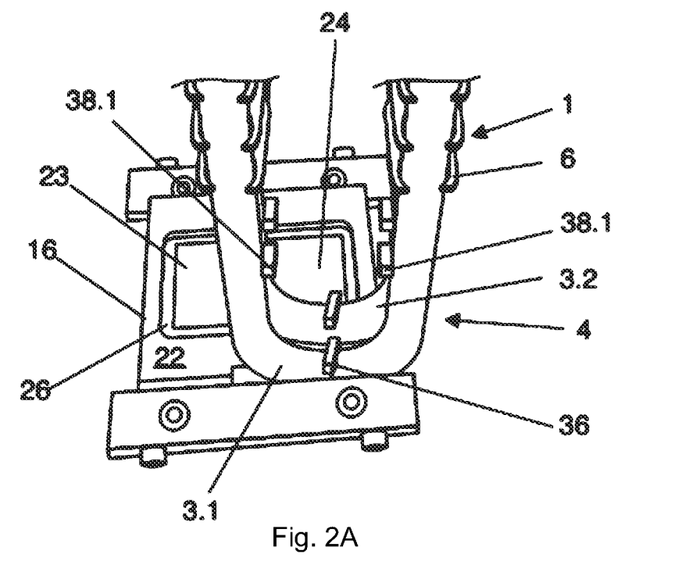
FIGS. 2A-2C show perspective views of assembly steps of a Coriolis flow meter for pharmaceutical bioprocess applications according to the present disclosure.
Figure 2B:
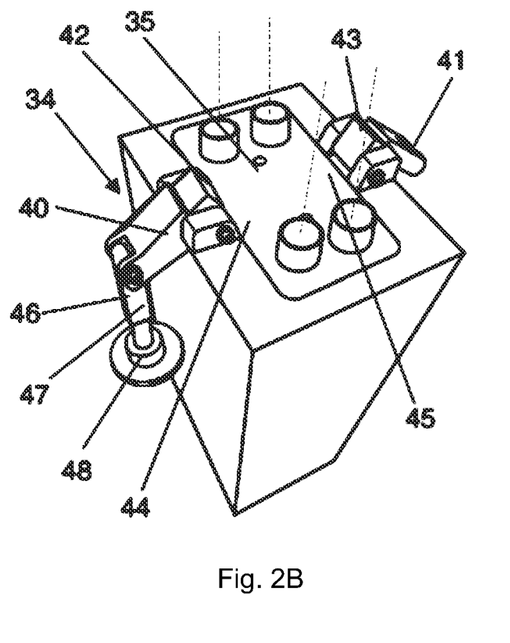
Figure 2C:
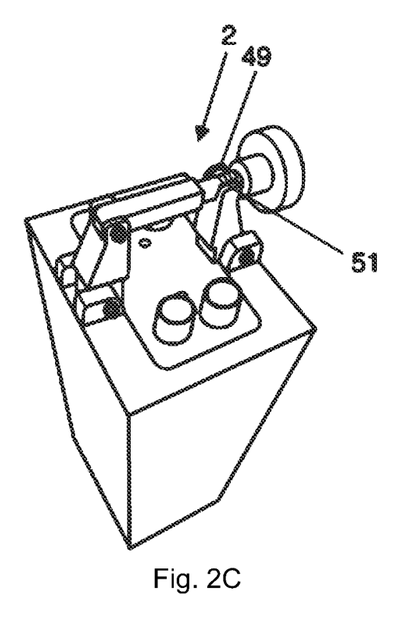

FIGS. 2A-2C show a series of views of individual assembly steps of a measuring device 2 of the invention. The measuring tube arrangement 4 includes two measuring tubes 3.1, 3.2, which are mechanically coupled with one another via a coupler arrangement 1. The coupler arrangement 1 in the illustrated embodiment comprises six coupling elements 6, which partially grip around the two measuring tubes 3.1, 3.2. The measuring tube arrangement 4 is embodied as a single-use article and can be mechanically releasably arranged and secured in a provided support apparatus 16. The two measuring tubes 3.1, 3.2 comprise, in each case, a measuring tube body 13.1, 13.2, which is formed, at least partially, of steel. Mounted on the measuring tube bodies 13.1, 13.2 are, in each case, an exciter magnet 36 and two sensor magnets 38.1, 38.2.

Support apparatus 16 includes a seat 29, which—other than shown in FIG. 1—extends not from a lateral surface, but, instead, from a front area, in the longitudinal direction of the support apparatus body 22. Additionally, the support apparatus body 22 of the support apparatus 16 includes an assembly surface 26, on which the measuring tube arrangement 4 lies in the installed state and which is embodied in such a manner that the measuring tubes 3.1, 3.2 of the measuring tube arrangement 4 do not contact the wall of the support apparatus 16. The assembly surface 26 surrounds the seat 29 in a cross section, such that in the case of the arranging of the measuring tube arrangement 4 a total edge region of the fixing body arrangement 35 lies on the assembly surface 26. The two exciter coils 37 of the oscillation exciters and the four sensor coils 39 of the oscillation sensors (not shown) are arranged in the support apparatus 16, especially, in each case, distributed on two diametrally oriented, lateral surfaces 24 of the seat 29.

For the installed state, the measuring tube arrangement 4 is introduced into the seat 29 and the fixing body arrangement 35 lies on the assembly surface 26. The measuring tube arrangement 4 is then ready to be secured to the support apparatus 16 by means of the fixing apparatus 34. For such purpose, the fixing apparatus 34 includes, according to the invention, a first fixing element 40 and a second fixing element 41, each of which is swingably embodied and has a fixing surface 42, 43. The fixing surfaces 42, 43 are located, in each case, at a first end of the fixing element 40, 41. The fixing elements 40, 41 have, in each case, an elongated fixing element body. In the end section comprising the first end, the fixing elements 40, 41 are secured on the support apparatus body 22 swingably about a rotational axis. The fixing elements 40, 41 are adapted to press the fixing body arrangement 44 against the assembly surface 26, in order, thus, to suppress movements of the fixing body arrangement. The first fixing element 40 is connected with a swingable connecting apparatus 46, which comprises a connecting body 47. The connection between the fixing element 40 and the swingable connecting apparatus 46 is located at the second end of the first fixing element 40. The connecting body 47 is embodied, at least partially, cubically and, in the end section, cylindrically. There, a securing apparatus 48 is arranged on the connecting body 47. In the illustrated embodiment, the end section of the connecting body 47 has an external screw thread and the securing apparatus 48 is embodied as a screw. Depending on application and the requirements for measuring performance, the securing apparatus 48 can also be embodied as a torque screw, a clamping bracket, a tightener, a rapid tightener, a clamping lever, a clamping retainer, a hood closure and/or an eccentric lever. Alternatively, (not shown) the securing apparatus 48 can be embodied as a buckle, especially a cuff buckle, which is arranged on a first fixing element 40 of the two fixing elements 40, 41. A swinging part of the second fixing element 41 is arranged correspondingly. In such case, the swinging part is embodied as a cuff swinging part, which has at least one hook, especially a cuff hook.

In the secured state, the fixing surfaces 42, 43 of the fixing elements 40, 41 contact the bearing areas 44, 45 of the fixing body arrangement 35. The connecting body 47 of the connecting apparatus 46 interacts with the second fixing element 41, i.e. the connecting apparatus 46, especially the connecting body 47, connects the first fixing element 40 with the second fixing element 41. The second fixing element 41 includes on the second face a guide 51 for the end section of the connecting body 47. The connecting body 47 extends in the secured state through the guide 51 of the second fixing element 41. The securing apparatus 48 contacts the clamping surface 49 of the second fixing element 41. Upon tightening of the securing apparatus 48—in the form of a screw—, the two fixing elements are brought uniformly toward one another. The securing apparatus 48 presses against the clamping surface 49. Because the two fixing elements 40, 41 are embodied swingably about rotational axes, the tightening and corresponding approaching of the fixing elements 40, 41 effects forces on the fixing body arrangement 35 in parallel with the longitudinal direction of the measuring tube arrangement 4 in the direction of the assembly surface 26. These forces provide a uniform securing of the measuring tube arrangement 4 on the body 22 of the support unit. The measuring tubes 3.1, 3.2 have, in each case, in the inlet section an inlet longitudinal axis and in the outlet section an outlet longitudinal axis, wherein a first longitudinal plane extends through the inlet longitudinal axes of the measuring tubes, wherein a second longitudinal plane extends through the outlet longitudinal axes of the measuring tubes, wherein the fixing body arrangement has a second face, which is oriented oppositely to the first face, wherein the first longitudinal plane and the second longitudinal plane bound a first area on the second face of the fixing body arrangement, wherein the inlet longitudinal axis and the outlet longitudinal axis of the first measuring tube extend in a third longitudinal plane, wherein the inlet longitudinal axis and the outlet longitudinal axis of the second measuring tube extend in a fourth longitudinal plane, wherein the third longitudinal plane and the fourth longitudinal plane bound a second area on the second face, wherein in the secured state the fixing surfaces of the fixing elements lie, especially exclusively, on the first area and, in such case, outside of the second area.

Figure 3:
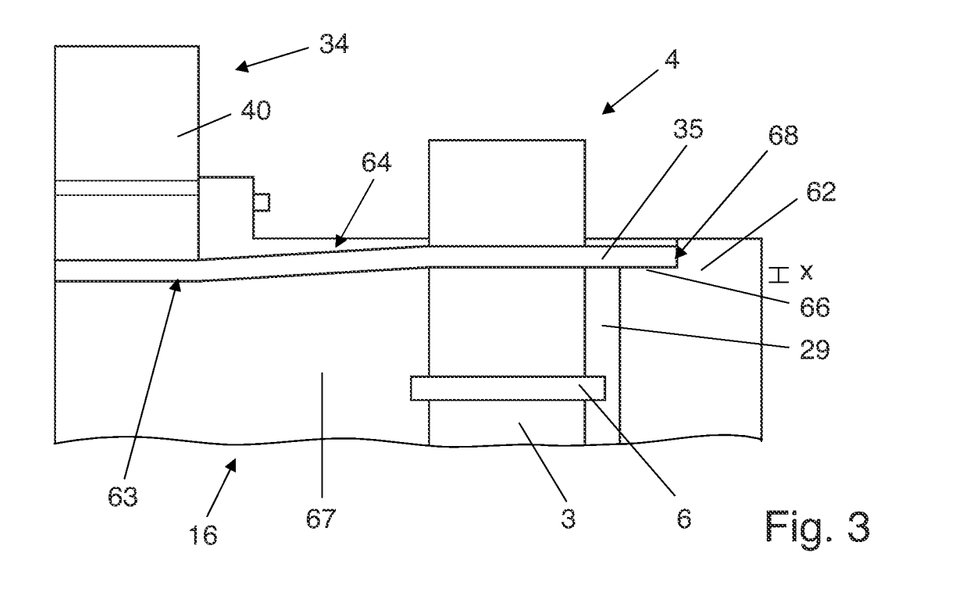
FIG. 3 shows a part of a longitudinal section of a first embodiment of the Coriolis flow meter according to the present disclosure.

FIG. 3 shows a part of a longitudinal section of a first embodiment of the Coriolis flow meter of the invention, comprising a support apparatus 16 and a measuring tube arrangement 4. The measuring tube arrangement 4 is arranged mechanically releasably in a seat of a support apparatus body 62. Support apparatus 16 includes a fixing apparatus 34 having a swingable fixing element 40, which is adapted to secure the measuring tube arrangement 4 in the seat 29. The fixing apparatus 34 is adapted to connect the measuring tube arrangement 4, especially the at least one shown measuring tube 3, via the fixing body arrangement 35 mechanically releasably with the support apparatus body 62. In the case of the connecting, the fixing element effects a bending force on the fixing body arrangement 35 in the direction of the seat 29, which leads to an elastic bending of the fixing body arrangement 35. The fixing body arrangement 35 is, thus, clamped in the seat. The fixing body arrangement 35 includes a first face 63 and a second face 64 and is embodied essentially planarly, i.e., plate-shaped. The bending effectively presses the fixing element 40 on the second face 64 of the fixing body arrangement 35. The fixing body arrangement 35 lies with the first face 63 on the bearing area 66 of the seat 29. In the illustrated embodiment, the fixing body arrangement 35 is held by way of both faces and bent without opposition in the direction of the seat 29. The seat is bounded transversely to the longitudinal direction by a support apparatus wall 67, in which at least one step 68 is formed. This step 68 provides the bearing area 66, against which the first face 63 of the fixing body arrangement 35 lies. In the secured state, a clamped area of the fixing body arrangement 35 is shifted by an offset x in the longitudinal direction of the measuring tube arrangement 4. The offset lies in the range of $0.05 < x \le 1$ millimeter, especially $0.1 < x \le 0.5$ millimeter and preferably $0.15 < x \le 0.25$ millimeter Alternatively, the fixing body arrangement can be embodied of a plurality of parts, wherein one part is connected with the at least one measuring tube by material bonding and another part is assembled at least by shape interlocking. This other part is embodied and adapted to serve as process connection for the measuring tubes to a process line. In this regard, the other part can have, for example, standardized process connections, for example in flange form or screw thread form.

Figure 4:
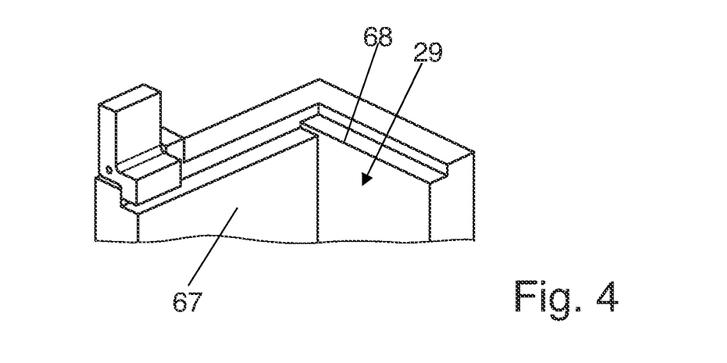
FIG. 4 shows a perspective view of a seat of the Coriolis flow meter according to the present disclosure.

FIG. 4 shows a partially sectioned perspective view of a seat 29 of a support apparatus of a second embodiment of the Coriolis flow meter of the invention. In contrast with the first embodiment, the support apparatus body 22 includes a second step, which is arranged in the longitudinal direction of the seat 29, especially in the installation direction of the measuring tube arrangement, at an offset z from the bearing area, wherein $z > 1$ millimeter. The seat is bounded transversely to the longitudinal direction by a support apparatus wall 67, which has a step 68 and a second step. Step 68 includes the bearing area 66, while the second step 69 is embodied in such a manner that the fixing body arrangement does not contact the second step in the clamped state.

Figure 5:
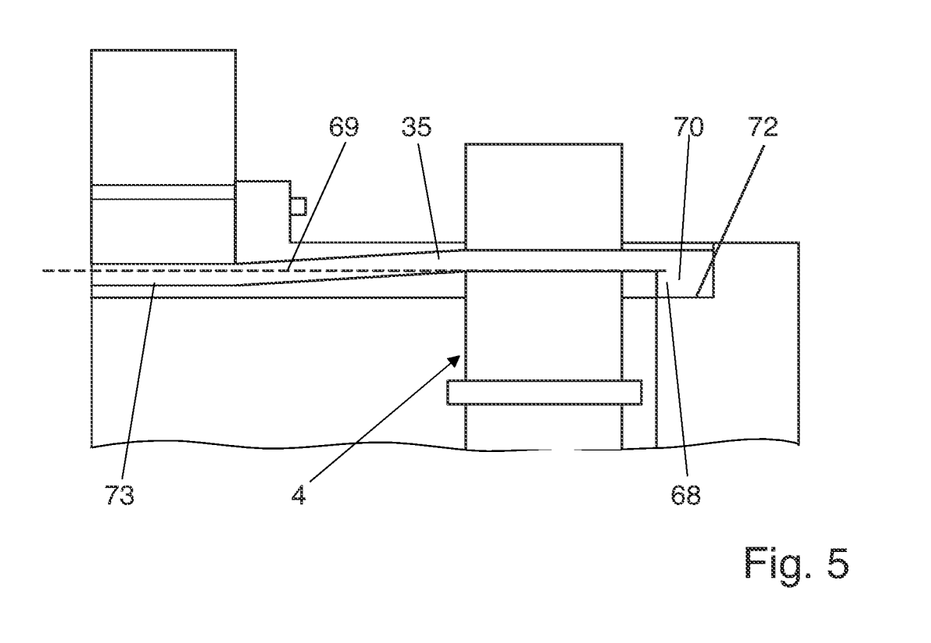
FIG. 5 shows a part of a longitudinal section of a second embodiment of the Coriolis flow meter according to the present disclosure.

FIG. 5 shows a part of a longitudinal section of a third embodiment of the Coriolis flow meter of the invention. The third embodiment differs from the first embodiment of FIG. 3 essentially in that the fixing body arrangement 35 has a second step 70, which has the first area 72, with which it lies on the step 68. Step 68 is embodied essentially as a planar bearing area. Such is embodied monolithically with the fixing body arrangement 35. The second step 70 has an offset y, wherein $0.05 < y \le 1$ millimeter. In the non-secured state of the measuring tube arrangement, a second area 73 of the fixing body arrangement lies in a plane 69. In the secured state, the fixing element clamps the fixing body arrangement in such a manner that the second area 73 is shifted in the longitudinal direction of the measuring tube arrangement offset from the plane 69. The second step 70, and the fixing elements, are also embodied in such a manner that in the secured state only the first area 72 contacts the step 68 and not the second area 73.

Figure 6:
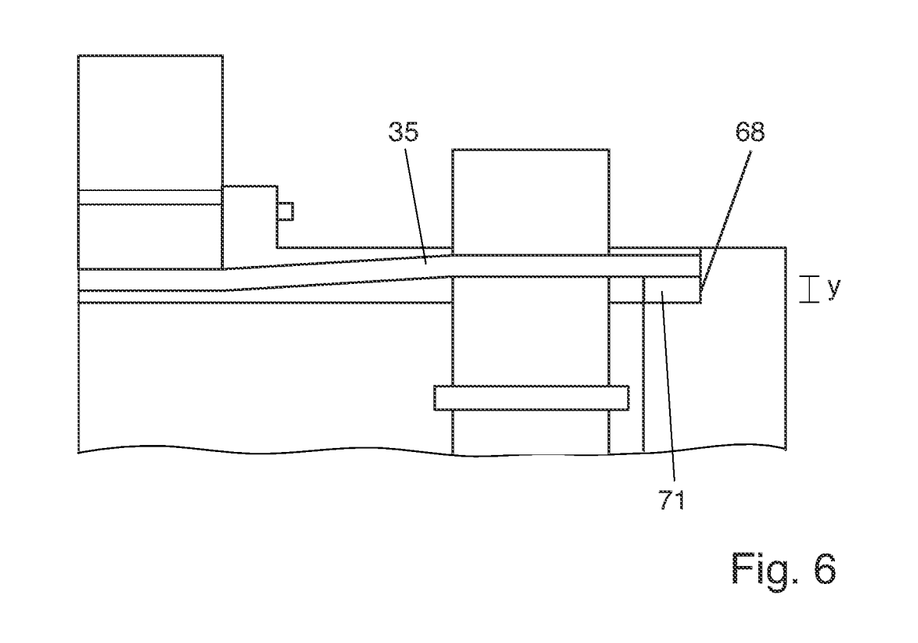
FIG. 6 shows a part of a longitudinal section of a third embodiment of the Coriolis flow meter according to the present disclosure.

FIG. 6 shows a part of a longitudinal section of a fourth embodiment of the Coriolis flow meter of the invention. The fourth embodiment differs from the first embodiment of FIG. 3 essentially in that an offset body 71 is arranged between fixing body arrangement 35 and the step 68. The offset body 71 can be connected with the step 68 or with the fixing body arrangement 35 by material bonding. In the fourth embodiment, the offset y is implemented via the offset body arranged on the step, or on the first face.

The invention claimed is:

1. A Coriolis flow meter, comprising:
a measuring tube arrangement including at least one measuring tube, which is configured to be flowed through by a medium, and a fixing body arrangement, which is disposed on the at least one measuring tube;
at least one oscillation exciter, which is adapted to excite the at least one measuring tube to execute oscillations, wherein the at least one oscillation exciter includes at least two oscillation exciter components, wherein the at least two oscillation exciter components comprise at least one exciter magnet and/or exciter coil, and wherein at least one of the at least two oscillation exciter components is arranged on the measuring tube arrangement;
at least one oscillation sensor, which is adapted to register oscillations of the at least one measuring tube, wherein the at least one oscillation sensor includes at least two oscillation sensor components, wherein the at least two oscillation sensor components comprise at least one sensor magnet and/or sensor coil, and wherein at least one of the at least two oscillation sensor components is arranged on the measuring tube arrangement;
a support apparatus comprising a support apparatus body, a seat and the at least one sensor coil and exciter coil,
wherein the measuring tube arrangement is arrangeable in the seat and connectable mechanically releasably with the support apparatus body,
wherein the support apparatus includes a fixing apparatus, which is configured to secure the measuring tube arrangement in the seat,
wherein the fixing apparatus includes at least one fixing element,
wherein the fixing apparatus is configured to connect the measuring tube arrangement via the fixing body arrangement mechanically releasably to the support apparatus body,
wherein the at least one fixing element is adapted to exert a bending force on the fixing body arrangement as to effect an elastic bending the fixing body arrangement.

2. The Coriolis flow meter claim 1, wherein in a secured state the bending force has at least one force component pointing in a longitudinal direction of the seat.

3. The Coriolis flow meter of claim 1, wherein the support apparatus body includes a bearing area in the seat adapted for the fixing body arrangement,
wherein the fixing body arrangement includes a first face, wherein the first face faces the at least one oscillation exciter component, and
wherein in a secured state the fixing body arrangement lies with the first face on the bearing area.

4. The Coriolis flow meter of claim 1, wherein the seat is bounded transversely to a longitudinal direction thereof by a support apparatus wall, wherein at least one step is formed in the support apparatus wall, and wherein the at least one step comprises the bearing area.

5. The Coriolis flow meter of claim 4, wherein an offset body is arranged between the at least one step and the fixing body arrangement.

6. The Coriolis flow meter of claim 1, wherein:
the fixing body arrangement includes on a first face a first area and a second area, wherein the second area lies in a plane;
the first face faces the at least one oscillation exciter component;
the first area and the second area are arranged offset from each other in a longitudinal direction of the measuring tube arrangement;
the support apparatus body includes in the seat an essentially planar bearing area adapted for the fixing body arrangement; and
in a secured state, the first area rests on the bearing area and the fixing body arrangement is bent by the at least one fixing element such that the second area is shifted in the longitudinal direction of the measuring tube arrangement offset from the plane.

7. The Coriolis flow meter of claim 6, wherein the seat consists of exactly one essentially planar bearing area adapted for the fixing body arrangement.

8. The Coriolis flow meter of claim 6, wherein the first area is disposed in a longitudinal direction of the seat at an offset relative to the second area, wherein the offset is greater than 0.05 millimeter (mm) and less or equal to 1 mm.

9. The Coriolis flow meter of claim 8, wherein the longitudinal direction of the seat is in an installation direction of the measuring tube arrangement.

10. The Coriolis flow meter of claim 8, wherein the offset is greater than 0.15 and less than or equal to 0.25 mm.

11. The Coriolis flow meter of claim 8, wherein between the first area and the second area a second step is disposed, which forms the offset.

12. The Coriolis flow meter of claim 1, wherein the at least one of the at least two oscillation exciter components arranged on the measuring tube arrangement is the at least one exciter magnet, and wherein at least one of the at least two oscillation sensor components arranged on the measuring tube arrangement is the at least one sensor magnet.

13. The Coriolis flow meter of claim 1, wherein the fixing element is rotatable or swingable.

\* \* \* \* \*